United States Patent
Lei et al.

(10) Patent No.: US 9,342,875 B2
(45) Date of Patent: May 17, 2016

(54) METHOD FOR GENERATING IMAGE BOKEH EFFECT AND IMAGE CAPTURING DEVICE

(71) Applicant: Altek Semiconductor Corp., Hsinchu (TW)

(72) Inventors: Su Ian Alias Eugene Lei, Hsinchu (TW); Kaiyu Tseng, Changhua County (TW); Wen-Yan Chang, Miaoli County (TW)

(73) Assignee: Altek Semiconductor Corp., Hsinchu (TW)

( * ) Notice: Subject to any disclaimer, the term of this patent is extended or adjusted under 35 U.S.C. 154(b) by 154 days.

(21) Appl. No.: 14/552,485

(22) Filed: Nov. 25, 2014

(65) Prior Publication Data
US 2016/0093032 A1    Mar. 31, 2016

(30) Foreign Application Priority Data
Sep. 25, 2014   (TW) .............................. 103133223 A

(51) Int. Cl.
*G06K 9/40* (2006.01)
*G06T 5/50* (2006.01)
*G06T 5/00* (2006.01)

(52) U.S. Cl.
CPC . *G06T 5/50* (2013.01); *G06T 5/002* (2013.01); *G06T 2207/20024* (2013.01)

(58) Field of Classification Search
None
See application file for complete search history.

(56) References Cited

U.S. PATENT DOCUMENTS

| 8,335,390 | B2 | 12/2012 | Li et al. |
| 8,629,868 | B1 | 1/2014 | Gardiner et al. |
| 2013/0033582 | A1* | 2/2013 | Sun et al. ........................ 348/47 |
| 2013/0230243 | A1* | 9/2013 | Intwala et al. ................. 382/167 |
| 2013/0236093 | A1* | 9/2013 | Gatt et al. ...................... 382/167 |

FOREIGN PATENT DOCUMENTS

| CN | 101968880 | 2/2011 |
| TW | 201345229 | 11/2013 |

* cited by examiner

*Primary Examiner* — Andrew Moyer
(74) *Attorney, Agent, or Firm* — Jianq Chyun IP Office; Belinda Lee

(57) ABSTRACT

An image capturing device and a method for generating a bokeh effect are provided. The method includes the following steps. An image including a current input pixel is captured. Next, blurring processes are performed on the image by using a first image blur filter and a second image blur filter so as to generate a plurality of first blur images and second blur images corresponding to different blur levels. A distance between the current input pixel and a focal plane is calculated to obtain a current distance. A first current blur image and a second current blur image are respectively selected from the first blur images and the second blur images according to the current distance. Next, a first current blur pixel of the first current blur image and a second current blur pixel of the second current blur image are combined to generate a current output pixel.

14 Claims, 3 Drawing Sheets

METHOD FOR GENERATING IMAGE BOKEH EFFECT AND IMAGE CAPTURING DEVICE

CROSS-REFERENCE TO RELATED APPLICATION

This application claims the priority benefit of Taiwan application serial no. 103133223, filed on Sep. 25, 2014. The entirety of the above-mentioned patent application is hereby incorporated by reference herein and made a part of this specification.

BACKGROUND OF THE INVENTION

1. Field of the Invention

The present invention generally relates to a technique for generating an image bokeh effect.

2. Description of Related Art

In photography, "bokeh" is a blur effect produced in an out-of-focus part of an image by a lens in order to enhance an aesthetic quality and emphasize a primary subject.

General speaking, a camera lens may only produce a fairly limited blur effect. To attain a satisfactory blur effect, conditions such as large aperture and long focal distance must be satisfied. In other words, a wide-aperture lens is required to enhance the blurriness of a long-distance object to create a blur effect so that a primary subject may stand out from a background. However, due to gigantic volume and expensive cost, a wide-aperture lens is not normally equipped in a consumer camera. In the related prior arts for generating an image bokeh effect, an image is mainly divided into a foreground region and a background region, where a blurring process is performed on the background region by using a blur filter. A more advanced approach is to set a different blur level according to a distance between each pixel of the image and a focal plane.

Nevertheless, optical properties of an image capturing device are often neglected in the prior arts. For example, an optical aberration is a departure of an actual image and an ideal image due to refraction, which causes a circle of confusion varying in different intensity distributions and sizes. The so-called "circle of confusion" is a diffused circle caused by a cone of light rays from a lens not coming to a perfect focus when imaging a point source. That is, an intensity distribution and a size of a circle of confusion may differ based on a relative position and distance from a focal plane. Hence, in the prior arts, a natural bokeh effect may not be simulated since only one single blur filter is used.

SUMMARY OF THE INVENTION

Accordingly, the present invention is directed to a method for generating a bokeh effect and an image capturing device which are able to simulate a natural bokeh effect on an image.

The present invention is directed to a method for generating a bokeh effect, adapted to an image capturing device. The method includes the following steps: capturing an image, where the image includes a current input pixel; performing a plurality of blurring processes on the image by using a first image blur filter and a second image blur filter to generate a plurality of first blur images and a plurality of second blur images corresponding to different blur levels; calculating a distance between the current input pixel and a focal plane to obtain a current distance; selecting a first current blur image and a second current blur image respectively from the first blur images and the second blur images according to the current distance; and combining a first current blur pixel of the first current blur image and a second current blur pixel of the second current blur image according to the current distance to generate a current output pixel corresponding to the current input pixel, where each of the first current blur pixel and the second current blur pixel has a same pixel coordinate as the current input pixel.

According to an embodiment of the present invention, the step of performing the blurring processes on the image respectively by the first image blur filter and the second image blur filter to generate the first blur images and the second blur images corresponding to the blur levels includes: setting a blur radius corresponding to each of the blur levels according to a predetermined maximum blur radius, where each of the blur radiuses is not greater than the predetermined maximum blur radius; and performing the blurring processes on the image with each of the blur radiuses by using the first image blur filter and the second image blur filter to generate the first blur images and the second blur images corresponding to each of the blur radiuses.

According to an embodiment of the present invention, the step of selecting the first current blur image and the second current blur image respectively from the first blur images and the second blur images according to the current distance includes: selecting the first current blur image and the second current blur image both corresponding to the current distance respectively from the first blur images and the second blur images, where the current distance is proportional to both of the blur level of the first current blur image and the blur level of the second current blur image.

According to an embodiment of the present invention, the step of combining the first current blur pixel of the first current blur image and the second current blur pixel of the second current blur image according to the current distance to generate the current output pixel corresponding to the current input pixel includes: setting a first combining weight of the first current blur pixel and a second combining weight of the second current blur pixel according to the current distance; and combining the first current blur pixel of the first current blur image and the second current blur pixel of the second current blur image according to the first combining weight and the second combining weight to generate the current output pixel.

According to an embodiment of the present invention, the first image blur filter is a circular blur filter, and the second image blur filter is a Gaussian blur filter.

According to an embodiment of the present invention, the first image blur filter performs the blurring processes on the image by leveraging a summed-area table algorithm to generate the first blur images.

According to an embodiment of the present invention, the first combining weight is inversely proportional to the current distance.

According to an embodiment of the present invention, the step of combining the first current blur pixel of the first current blur image and the second current blur pixel of the second current blur image according to the current distance to generate the current output pixel corresponding to the current input pixel includes: determining whether a current position of the current input pixel is ahead of or behind the focal plane; when the current position is ahead of the focal plane, adding the first current blur pixel and the second current blur pixel with the first combining weight and the second combining weight to generate the current output pixel, where a summation of the first combining weight and the second combining weight is 1; and when the current position is behind the focal plane, subtracting the second current blur pixel from the first current blur pixel with the first combining weight and the second combining weight to generate the current output pixel, where a difference of the first combining weight and the second combining weight is 1.

The invention is also directed to an image capturing device including at least one lens, a storage unit, and at least one processing unit, where the processing unit is coupled to the lens and the storage unit. The storage unit is configured to record a plurality of modules. The processing unit is configured to access and execute the modules recorded in the storage unit. The modules include an image capturing module, a blur filtering module, a distance calculating module, an image selecting module, and an image combining module. The image capturing module is configured to capture an image by using the lens, where the image includes a current input pixel. The blur filtering module is configured to perform a plurality of blurring processes on the image by using a first image blur filter and a second image blur filter to generate a plurality of first blur images and a plurality of second blur images corresponding to different blur levels. The distance calculating module is configured to calculate a distance between the current input pixel and a focal plane to obtain a current distance. The image selecting module is configured to select a first current blur image and a second current blur image respectively from the first blur images and the second blur images according to the current distance. The image combining module is configured to combine a first current blur pixel of the first current blur image and a second current blur pixel of the second current blur image according to the current distance to generate a current output pixel corresponding to the current input pixel, where each of the first current blur pixel and the second current blur pixel has a same pixel coordinate as the current input pixel.

According to an embodiment of the present invention, the blur filtering module sets a blur radius corresponding to each of the blur levels according to a predetermined maximum blur radius, and performs the blurring processes on the image with each of the blur radiuses by using the first image blur filter and the second image blur filter to generate the first blur images and the second blur images corresponding to each of the blur radiuses, where each of the blur radiuses is not greater than the predetermined maximum blur radius.

According to an embodiment of the present invention, the image selecting module selects the first current blur image and the second current blur image both corresponding to the current distance respectively from the first blur images and the second blur images, wherein the current distance is proportional to both of the blur level of the first current blur image and the blur level of the second current blur image.

According to an embodiment of the present invention, the image combining module sets a first combining weight of the first current blur pixel and a second combining weight of the second current blur pixel according to the current distance, and combines the first current blur pixel of the first current blur image and the second current blur pixel of the second current blur image according to the first combining weight and the second combining weight to generate the current output pixel.

According to an embodiment of the present invention, the first image blur filter is a circular blur filter, and the second image blur filter is a Gaussian blur filter.

According to an embodiment of the present invention, the first image blur filter performs the blurring processes on the image by leveraging a summed-area table algorithm to generate the first blur images.

According to an embodiment of the present invention, the first combining weight is inversely proportional to the current distance.

According to an embodiment of the present invention, the image combining module determines whether a current position of the current input pixel is ahead of or behind the focal plane. When the current position is ahead of the focal plane, the image combining module adds the first current blur pixel and the second current blur pixel with the first combining weight and the second combining weight to generate the current output pixel, wherein a summation of the first combining weight and the second combining weight is 1. When the current position is behind the focal plane, subtracting the second current blur pixel from the first current blur pixel with the first combining weight and the second combining weight to generate the current output pixel, wherein a difference of the first combining weight and the second combining weight is 1.

To sum up, in the method and the image capturing device for generating an image bokeh effect proposed in the invention, an image with a natural bokeh effect may be simulated by using two blur filters with different properties taking into account that an intensity distribution and a size of a circle of confusion may be varied based on a relative position and distance from a focal plane.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
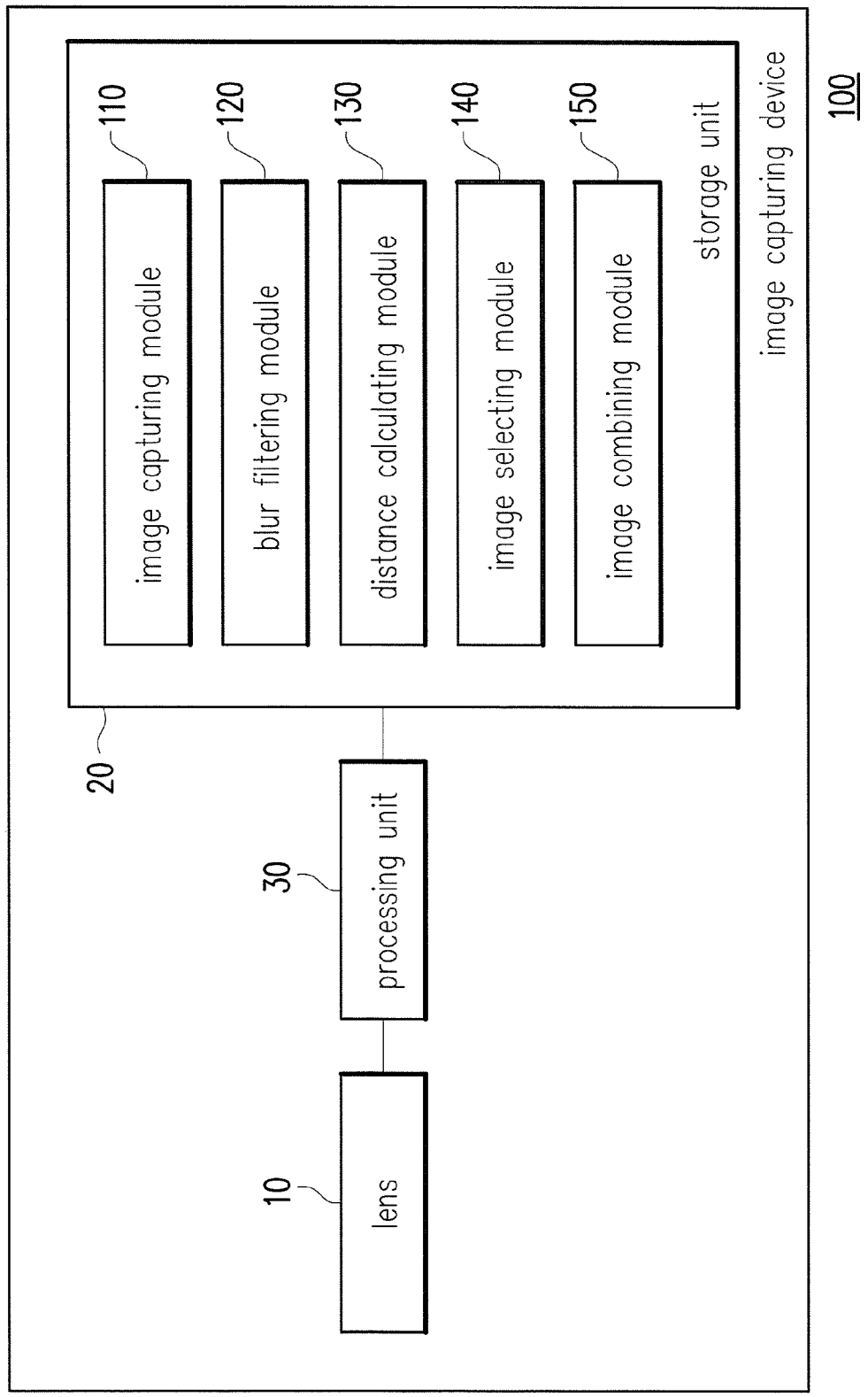
FIG. 1 illustrates a block diagram of an image capturing device according to an embodiment of the invention.

Reference will now be made in detail to the present embodiments of the invention, examples of which are illustrated in the accompanying drawings. Wherever possible, the same reference numbers are used in the drawings and the description to refer to the same or like parts. In addition, the specifications and the like shown in the drawing figures are intended to be illustrative, and not restrictive. Therefore, specific structural and functional detail disclosed herein are not to be interpreted as limiting, but merely as a representative basis for teaching one skilled in the art to variously employ the invention.

FIG. 1 illustrates a block diagram of an image capturing device according to an embodiment of the invention. It should, however, be noted that this is merely an illustrative example and the invention is not limited in this regard. All components of the image capturing device and their configurations are first introduced in FIG. 1. The detailed functionalities of the components are disclosed along with FIG. 2.

Referring to FIG. 1, an image capturing device 100 includes at least one lens 10, a storage unit 20, and at least one processing units 30. In the present embodiment, the image capturing device 100 is, for example, a digital camera, a digital camcorder, a digital single lens reflex camera or other devices provided with an image capturing feature such as a smart phone, a tablet computer, a personal digital assistant, and so on. The invention is not limited herein.

The lens 10 includes optical sensing elements for sensing light intensity entering the lens 10 to thereby generate an image. The optical sensing elements are, for example, charge-coupled-device (CCD) elements, complementary metal-oxide semiconductor (CMOS) elements, and yet the invention is not limited thereto.

The storage unit 20 may be one or a combination of a stationary or mobile random access memory (RAM), a read-only memory (ROM), a flash memory, a hard drive or other similar devices. The storage unit 20 is configured to record a plurality of modules executable by the processing unit 30, where the modules may be loaded into the processing unit 30 for creating a bokeh effect on an image captured by the image capturing device 100.

The processing unit 30 may be, for example, a central processing unit (CPU) or other programmable devices for general purpose or special purpose such as a microprocessor and a digital signal processor (DSP), a programmable controller, an application specific integrated circuit (ASIC), a programmable logic device (PLD) or other similar devices or a combination of above-mentioned devices. The processing unit 30 is coupled to the lens 10 and the storage unit 20, and capable of accessing and executing the modules recorded in the storage unit 20.

The aforesaid modules include an image capturing module 110, a blur filtering module 120, a distance calculating module 130, an image selecting module 140, and an image combining module 150, where the modules may be loaded into the processing unit 30 for processing an image captured by the image capturing device 100 so that the processed image may have a bokeh effect.

Figure 2:
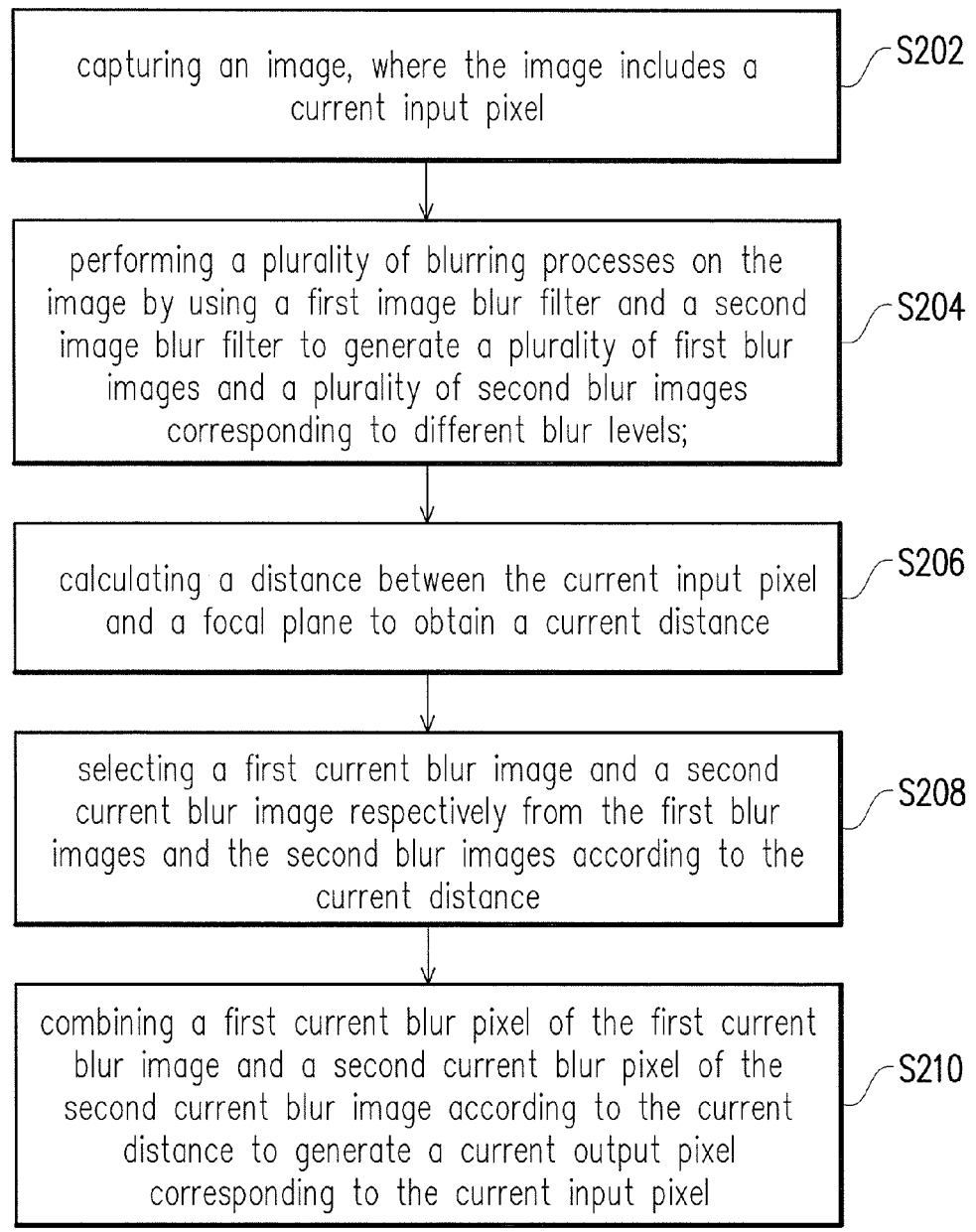
FIG. 2 illustrates a flowchart of a method for generating an image bokeh effect according to an embodiment of the invention.

FIG. 2 illustrates a flowchart of a method for generating an image bokeh effect according to an embodiment of the invention, and the method in FIG. 2 may be implemented by the components of the image capturing device 100 in FIG. 1.

Referring to both FIG. 1 and FIG. 2, the image capturing module 110 first captures an image (Step S202). The image captured by the image capturing module 110 herein may be, for example, a preview image and includes a plurality of pixels arranged in rows and columns. In the present embodiment, since the processing procedure for each of the pixels is identical, only one of the pixels, referred to as a "current input pixel," would be illustrated hereinafter.

In general, an intensity distribution and a size of a circle of confusion may be different due to optical aberration. On a perfect lens with no optical aberration, a circle of confusion would be a disk with uniform intensity. However, a circle of confusion may differ according to its relative distance and position from a focal plane.

Figure 3:
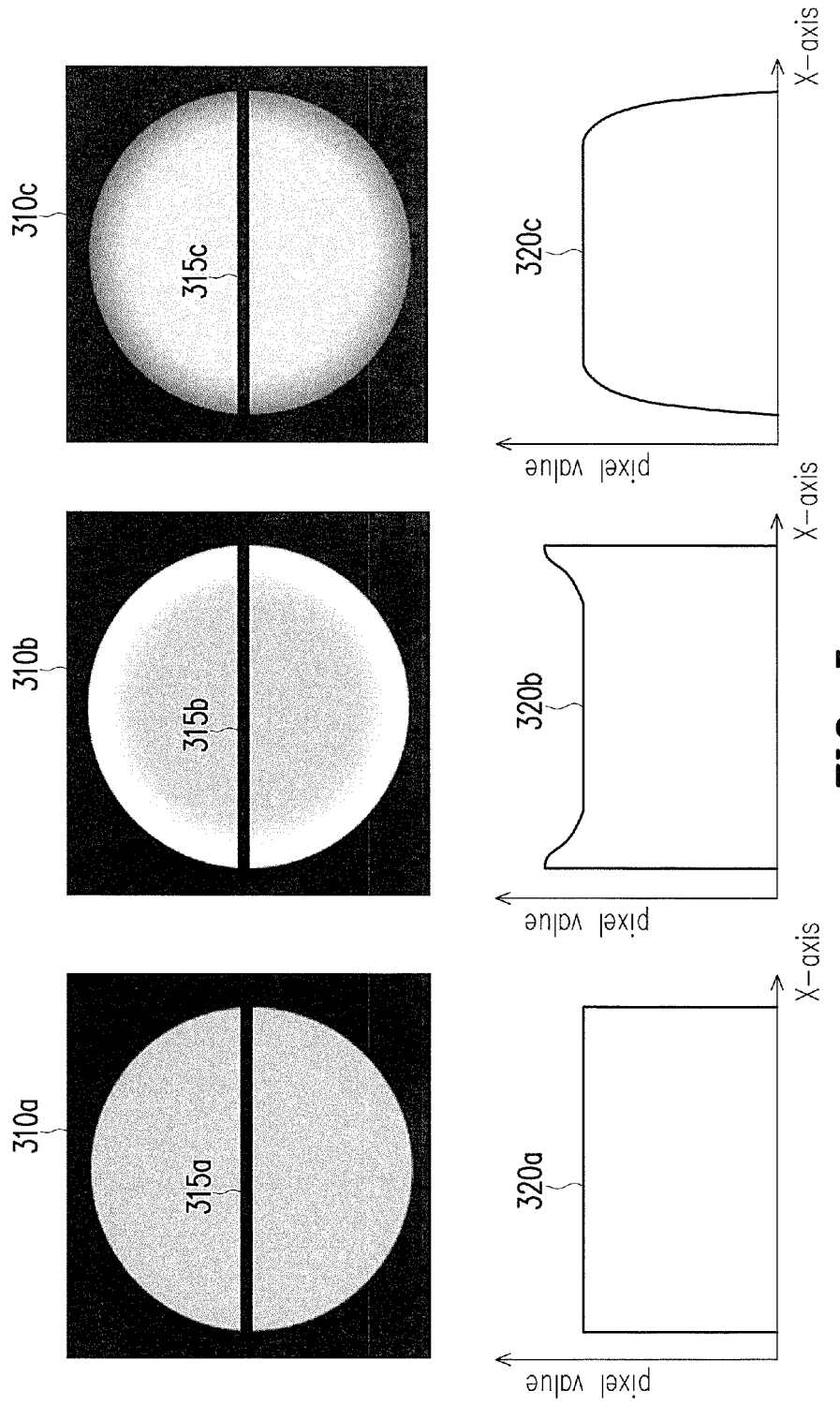
FIG. 3 illustrates three circles of confusion and relationships between a position and an intensity of each pixel of each diameter of the three circles of confusion.

For example, FIG. 3 illustrates three circles of confusion and relationships between a position and an intensity of each pixel of each diameter of the three circles of confusion.

Referring to FIG. 3, a circle of confusion 310a is a circle of confusion with no optical aberration, where it appears as a disk with uniform intensity. Therefore, a relationship curve 320a between an x-coordinate of each pixel of a diameter 315a and its intensity is a straight line.

A circle of confusion 310b is a circle of confusion located ahead of a focal plane, where it appears as a disk with pronounced edges. Therefore, a relationship curve 320b between an x-coordinate of each pixel of a diameter 315b and its intensity is a curve having higher values on both sides and lower values at the center.

A circle of confusion 310c is a circle of confusion located behind a focal plane, where it appears as a disk with soft edges. Therefore, a relationship curve 320c between an x-coordinate of each pixel of a diameter 315c and its intensity is a curve having lower values on both sides and higher values at the center.

Based on the above observation, different image bokeh effects may be simulated by two different image blur filters in the present embodiment. That is, after the image capturing module 110 captures an image, the blur filtering module 120 would perform blurring processes on the image by using a first image blur filter and a second image blur filter to generate a plurality of first blur images and a plurality of second blur images corresponding to different blur levels (Step S204). In the present embodiment, to simulate circles of confusion under an ideal and non-ideal condition as those presented in FIG. 3, the first image blur filter may be a circular blur filter, and the second image blur filter may be a Gaussian blur filter. In other embodiments, other blur filters may be used as the first image blur filter and the second image blur filter depending on an actual condition or a particular effect desired to be presented on a final output image. For example, the first image blur filter may be a circular blur filter or a Gaussian blur filter, and a second image blur filter may be a triangular blur filter, a box filter, or other types of blur filters. The invention is not limited herein.

Moreover, the sizes of the circles of confusion are determined by the clarity of the image. When the circles of confusion are smaller, their overlapping regions are also smaller so that the image becomes clearer. From another point of view, the size of each of the circles of confusion is associated with its relative distance from the focal plane. Accordingly, the blur filtering module 120 may perform the blurring processes with different levels on the image by using the first image blur filter and the second image blur filter. To be specific, the blur filtering module 120 may set a blur radius corresponding to each of the blur levels according to a predetermined maximum blur radius, where each of the blur radiuses is not greater than the predetermined maximum blur radius. The predetermined maximum blur radius may be set based on user preference, and the number of the blur radiuses may be determined thereby. In an embodiment, assume that the maximum blur radius is 8 pixels, then the blur radiuses may be 2, 4, 6, and 8 pixels. Next, the blur filtering module 120 may perform the blurring processes on the image with each of the blur radiuses by using the first image blur filter and the second image blur filter to generate the first blur images and the second blur images with different blur levels.

It should be noted that, in terms of a Gaussian blur filter used as the second image blur filter in the present embodiment, it uses a two-dimensional normal distribution for calculating the transformation to apply to each pixel in the image. Since the Gaussian blur filter is a separable filter, it may perform calculation on a two-dimensional image in two independent one-dimensional spaces separately to reduce the time complexity for blur filtering.

On the other hand, in terms of a circular blur filter used as the first image blur filter in the present embodiment, the time complexity for blur filtering is $O(n^2)$ due to its non-separable property. In the present embodiment, since the circular blur filter performs blur filtering according to a mean value of a local patch of each processing pixel, it may first partition the image into a plurality of rectangular local patches. After obtaining a value of the local patch of each of the processing pixel by leveraging a summed-area-table algorithm, the circular blur filter may then obtain the filtering result, where the time complexity is reduced to $O(n)$.

After the blur filtering module 120 obtains the first blur images and second blur images corresponding to different blur filters and different blur levels, the distance calculating module 130 would calculate a distance between the current input pixel and a focal plane to obtain a current distance (Step S206), and the image selecting module 140 would select a first current blur image and a second current blur image respectively from the first blur images and the second blur images according to the current distance (Step S208). To be specific, the distance calculating module 130 may first obtain the focal plane according to a focal distance of the lens 10, and then calculate the distance between the current input pixel and the focal plane according to depth information of the current input pixel. Since the blur level of each of the first blur images and the second blur images corresponds to the relative distance between a captured region and the focal plane, the blur level and the relative distance are proportional. Hence, the image selecting module 140 may select the first current blur image and the second current blur image respectively from the first blur images and the second blur images according to the current distance corresponding to the current input pixel calculated by the distance calculating module 130. For instance, if the current distance is infinity (e.g., more than 5 meters), the first current blur image and the second blur image would be the images with maximum blur levels among the first blur images and the second blur images respectively.

Next, the image combining module 150 combines a first current blur pixel of the first current blur image and a second current blur pixel of the second current blur image to generate a current output pixel corresponding to the current input pixel (Step S210), where each of the first current blur pixel and the second current blur pixel has a same pixel coordinate as the current input pixel. The image combining module 150 may determine a combining weight for each of the first current blur pixel and the second current blur pixel based on the current distance. The combining weight for each of the first current blur pixel and the second current blur pixel may be referred to as a "first combining weight" and a "second combining weight." The image combining module 150 may combine the first current blur pixel and the second current blur pixel according to the first combing weight and the second combining weight to generate the current output pixel.

In terms of a circular blur filter used as the first image blur filter in the present embodiment, the circle of confusion is approximate to that under an ideal condition as it is closer to the focal plane, and thus the first combining weight is inversely proportional to the current distance. Moreover, the circle of confusion may differ as it is ahead of or behind the focal plane. According to FIG. 3(b) and FIG. 3(c), the circle of confusion located ahead of a focal plane appears as a disk with pronounced edges while the circle of confusion located behind the circle of confusion appears as a disk with soft edges. Hence, the image combining module 150 may first determine whether the current position of the current input pixel is ahead of or behind the focal plane to simulate circles of confusion with different intensity distributions.

When the image combining module 150 determines that the current position is ahead of the focal plane, it may add the first current blur pixel and the second current blur pixel with the first combining weight and the second combining weight to generate the current output pixel, where a summation of the first combining weight and the second combining weight is 1. To be specific, in an embodiment, the image combining module 150 may generate the current output pixel according to Eq.(1):

$$I_{out}(x) + w_1 \times I_{blur1}(x) + w_2 \times I_{blur2}(x) \qquad \text{Eq.(1)}$$

where $I_{out}(x)$ represents the current input pixel with the pixel coordinate x; $I_{blur1}(x)$ and $I_{blur2}(x)$ respectively represents the first current blur pixel and the second current blur pixel with the pixel coordinate x; $w_1$ and $w_2$ respectively represent the first combining weight and the second combining weight and satisfy $w_1 + w_2 = 1$.

On the other hand, when the image combining module 150 determines that the current position is located behind the focal plane, it may subtract the second current blur pixel from the first current blur pixel with the second combining weight and the first combining weight to generate the current output pixel, where a difference of the first combining weight and the second combining weight is 1. To be specific, in an embodiment, the image combining module 150 may generate the current output pixel according to Eq.(2):

$$I_{out}(x) = w_1 \times I_{blur1}(x) - w_2 \times I_{blur2}(x) \qquad \text{Eq.(2)}$$

where $w_1$ and $w_2$ respectively represent the first combining weight and the second combining weight and satisfy $w_1 - w_2 = 1$.

After the distance calculating module 130, the image selecting module 140, and the image combining module 150 complete Step S206, Step S208, and Step S210 on all of the pixels of the images, an output image with a bokeh effect may be generated.

To sum up, in the method and the image capturing device for generating an image bokeh effect proposed in the invention, an image with a natural bokeh effect may be simulated by using two blur filters with different properties taking into account that an intensity distribution and a size of a circle of confusion may be varied based on a relative position and distance from a focal plane.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for generating a bokeh effect, adapted to an image capturing device, comprising:
   capturing an image, wherein the image comprises a current input pixel;
   performing a plurality of blurring processes on the image by using a first image blur filter and a second image blur filter to generate a plurality of first blur images and a plurality of second blur images corresponding to different blur levels;
   calculating a distance between the current input pixel and a focal plane to obtain a current distance;
   selecting a first current blur image and a second current blur image respectively from the first blur images and the second blur images according to the current distance; and
   combining a first current blur pixel of the first current blur image and a second current blur pixel of the second current blur image according to the current distance to generate a current output pixel corresponding to the current input pixel, comprising:
   setting a first combining weight of the first current blur pixel and a second combining weight of the second current blur pixel according to the current distance; and
   combining the first current blur pixel of the first current blur image and the second current blur pixel of the second current blur image according to the first combining weight and the second combining weight to generate the current output pixel,
wherein each of the first current blur pixel and the second current blur pixel has a same pixel coordinate as the current input pixel.

2. The method according to claim 1, wherein the step of performing the blurring processes on the image respectively by the first image blur filter and the second image blur filter to generate the first blur images and the second blur images corresponding to the blur levels comprises:
setting a blur radius corresponding to each of the blur levels according to a predetermined maximum blur radius, wherein each of the blur radiuses is not greater than the predetermined maximum blur radius; and
performing the blurring processes on the image with each of the blur radiuses by using the first image blur filter and the second image blur filter to generate the first blur images and the second blur images corresponding to each of the blur radiuses.

3. The method according to claim 1, wherein the step of selecting the first current blur image and the second current blur image respectively from the first blur images and the second blur images according to the current distance comprises:
selecting the first current blur image and the second current blur image both corresponding to the current distance respectively from the first blur images and the second blur images, wherein the current distance is proportional to both of the blur level of the first current blur image and the blur level of the second current blur image.

4. The method according to claim 1, wherein the first image blur filter is a circular blur filter, and the second image blur filter is a Gaussian blur filter.

5. The method according to claim 4, wherein the first image blur filter performs the blurring processes on the image by leveraging a summed-area table algorithm to generate the first blur images.

6. The method according to claim 4, wherein the first combining weight is inversely proportional to the current distance.

7. The method according to claim 6, wherein the step of combining the first current blur pixel of the first current blur image and the second current blur pixel of the second current blur image according to the current distance to generate the current output pixel corresponding to the current input pixel comprises:
determining whether a current position of the current input pixel is ahead of or behind the focal plane;
when the current position is ahead of the focal plane, adding the first current blur pixel and the second current blur pixel with the first combining weight and the second combining weight to generate the current output pixel, wherein a summation of the first combining weight and the second combining weight is 1; and
when the current position is behind the focal plane, subtracting the second current blur pixel from the first current blur pixel with the first combining weight and the second combining weight to generate the current output pixel, wherein a difference of the first combining weight and the second combining weight is 1.

8. An image capturing device comprising:
at least one lens;
a memory; and
at least one processor, coupled to the lens and the memory, and configured for:
capturing an image by using the lens, wherein the image comprises a current input pixel;
performing a plurality of blurring processes on the image by using a first image blur filter and a second image blur filter to generate a plurality of first blur images and a plurality of second blur images corresponding to different blur levels;
calculating a distance between the current input pixel and a focal plane to obtain a current distance;
selecting a first current blur image and a second current blur image respectively from the first blur images and the second blur images according to the current distance; and
combining a first current blur pixel of the first current blur image and a second current blur pixel of the second current blur image according to the current distance to generate a current output pixel corresponding to the current input pixel by setting a first combining weight of the first current blur pixel and a second combining weight of the second current blur pixel according to the current distance and by combining the first current blur pixel of the first current blur image and the second current blur pixel of the second current blur image according to the first combining weight and the second combining weight to generate the current output pixel, wherein each of the first current blur pixel and the second current blur pixel has a same pixel coordinate as the current input pixel.

9. The image capturing device according to claim 8, wherein the processor sets a blur radius corresponding to each of the blur levels according to a predetermined maximum blur radius, and performs the blurring processes on the image with each of the blur radiuses by using the first image blur filter and the second image blur filter to generate the first blur images and the second blur images corresponding to each of the blur radiuses, wherein each of the blur radiuses is not greater than the predetermined maximum blur radius.

10. The image capturing device according to claim 8, wherein the processor selects the first current blur image and the second current blur image both corresponding to the current distance respectively from the first blur images and the second blur images, wherein the current distance is proportional to both of the blur level of the first current blur image and the blur level of the second current blur image.

11. The image capturing device according to claim 8, wherein the first image blur filter is a circular blur filter, and the second image blur filter is a Gaussian blur filter.

12. The image capturing device according to claim 11, wherein the first image blur filter performs the blurring processes on the image by leveraging a summed-area table algorithm to generate the first blur images.

13. The image capturing device according to claim 11, wherein the first combining weight is inversely proportional to the current distance.

14. The image capturing device according to claim 13, wherein the processor determines whether a current position of the current input pixel is ahead of or behind the focal plane,
wherein when the current position is ahead of the focal plane, the processor adds the first current blur pixel and the second current blur pixel with the first combining weight and the second combining weight to generate the current output pixel, wherein a summation of the first combining weight and the second combining weight is 1, and
wherein when the current position is behind the focal plane, the processor subtracts the second current blur pixel from the first current blur pixel with the first combining weight and the second combining weight to generate the current output pixel, wherein a difference of the first combining weight and the second combining weight is 1.

* * * * *